(12) United States Patent
Naranjo Vistorte

(10) Patent No.: US 12,475,332 B1
(45) Date of Patent: Nov. 18, 2025

(54) MOBILE APP FOR TRANSLATIONS DURING VIDEO/AUDIO COMMUNICATION SESSIONS

(71) Applicant: Livan Naranjo Vistorte, Oviedo, FL (US)

(72) Inventor: Livan Naranjo Vistorte, Oviedo, FL (US)

( * ) Notice: Subject to any disclaimer, the term of this patent is extended or adjusted under 35 U.S.C. 154(b) by 225 days.

(21) Appl. No.: 18/092,139

(22) Filed: Dec. 30, 2022

Related U.S. Application Data

(60) Provisional application No. 63/295,123, filed on Dec. 30, 2021.

(51) Int. Cl.
| | |
|---|---|
| *G06F 40/51* | (2020.01) |
| *H04L 65/401* | (2022.01) |
| *H04N 7/14* | (2006.01) |

(52) U.S. Cl.
CPC .......... *G06F 40/51* (2020.01); *H04L 65/4015* (2013.01); *H04N 7/147* (2013.01)

(58) Field of Classification Search
CPC ...... G06F 8/30; G06F 21/6218; G06F 40/242; G06F 40/253; G06F 40/45; G06F 40/47; G06F 40/51; G06F 3/14; G06F 40/166; G06F 40/58; G06Q 30/015; G06Q 30/02; G06Q 30/0601; G06Q 30/08; G06Q 50/10; H04L 51/18; H04L 65/4015; H04L 12/1822; H04N 7/147; H04N 5/144; H04N 7/15; H04W 12/04; G06T 13/40; G09B 21/009; H04M 3/2218; H04M 3/42221; H04M 3/5133

See application file for complete search history.

(56) References Cited

U.S. PATENT DOCUMENTS

| | | | |
|---|---|---|---|
| 7,287,225 B2 | 10/2007 | Mindrum | |
| 7,624,344 B2 | 11/2009 | Mindrum et al. | |

(Continued)

FOREIGN PATENT DOCUMENTS

| | | |
|---|---|---|
| WO | 2019144230 | 8/2019 |

*Primary Examiner* — Gerald Gauthier
(74) *Attorney, Agent, or Firm* — John Rizvi; John Rizvi, P.A.—The Patent Professor ®

(57) ABSTRACT

A method, a system and a computer program product provides context relevant language translation services for real-time communication sessions. A session-based language translation (SLT) utility/module receives from a user/individual a service request for translation between a first language and a second language by a human translation specialist during a scheduled live communication session. The SLT utility receives from the user contextual information, which describes the communication as one or more of social/conversational, business, and professional communication. In addition, the SLT utility enables the user to select expected attributes of the language specialist including required skills and knowledge of the specialist. Based on the received information, the SLT utility provides a set of available candidates matching the requested context and attributes to enable the user to make a final selection. The SLT utility provides the selected translation specialist with credentials to access the communication session in order to perform the requested translation services once the user provides a context-dependent service payment.

17 Claims, 7 Drawing Sheets

(56) References Cited

U.S. PATENT DOCUMENTS

| | | | |
|---|---|---|---|
| 7,937,261 B2* | 5/2011 | Wang | G06Q 30/0601 |
| | | | 704/8 |
| 8,725,490 B2* | 5/2014 | Athsani | G06F 40/58 |
| | | | 703/3 |
| 8,855,996 B1* | 10/2014 | Van Dijke | G06Q 50/10 |
| | | | 704/8 |
| 8,875,062 B1* | 10/2014 | Umapathy | G06Q 30/02 |
| | | | 715/744 |
| 9,015,262 B2 | 4/2015 | Luber | |
| 9,330,278 B1* | 5/2016 | Umapathy | H04L 51/18 |
| 9,460,300 B1* | 10/2016 | Kissner | G06F 21/6218 |
| 9,501,264 B2* | 11/2016 | Nethery, III | G06F 8/30 |
| 9,529,841 B1 | 12/2016 | Girdwood et al. | |
| 10,885,318 B2* | 1/2021 | Maxwell | H04N 5/144 |
| 10,917,524 B1* | 2/2021 | Curtin | H04M 3/2218 |
| 2007/0294076 A1* | 12/2007 | Shore | G06F 40/47 |
| | | | 704/2 |
| 2008/0120087 A1* | 5/2008 | Scanlan | G06F 40/45 |
| | | | 704/5 |
| 2010/0121989 A1 | 5/2010 | Morris | |
| 2014/0025591 A1 | 1/2014 | Villa, III | |
| 2014/0181695 A1* | 6/2014 | Travis | H04M 3/42221 |
| | | | 715/753 |
| 2014/0236566 A1* | 8/2014 | Schreier | G06Q 30/08 |
| | | | 704/2 |
| 2015/0057994 A1* | 2/2015 | Fang | G06F 40/253 |
| | | | 704/4 |
| 2016/0048841 A1* | 2/2016 | Johnson | G06Q 30/015 |
| | | | 705/304 |
| 2016/0050393 A1* | 2/2016 | Mande | H04N 7/15 |
| | | | 348/14.12 |
| 2017/0169319 A1 | 6/2017 | Sandan | |
| 2017/0289081 A1 | 10/2017 | Barrett | |
| 2018/0124136 A1* | 5/2018 | Faulkner | H04N 7/15 |
| 2019/0052473 A1* | 2/2019 | Soni | G09B 21/009 |
| 2020/0007685 A1* | 1/2020 | George | H04M 3/5133 |
| 2020/0227033 A1 | 7/2020 | Gustman et al. | |
| 2020/0294042 A1* | 9/2020 | Day | H04W 12/04 |
| 2020/0371677 A1* | 11/2020 | Faulkner | G06F 3/14 |
| 2021/0084083 A1* | 3/2021 | Pearce | H04L 12/1822 |
| 2022/0139417 A1* | 5/2022 | Maxwell | H04N 7/15 |
| | | | 704/235 |
| 2023/0096543 A1* | 3/2023 | Moy | G06F 40/58 |
| | | | 704/3 |
| 2023/0186899 A1* | 6/2023 | Waibel | G06F 40/166 |
| | | | 704/2 |
| 2023/0196034 A1* | 6/2023 | Sang | G06F 40/242 |
| | | | 704/2 |
| 2023/0259719 A1* | 8/2023 | Barry | G06F 40/58 |
| | | | 704/2 |
| 2024/0233745 A1* | 7/2024 | Maxwell | G06T 13/40 |
| 2024/0330607 A1* | 10/2024 | Xu | G06Q 30/015 |

* cited by examiner

MOBILE APP FOR TRANSLATIONS DURING VIDEO/AUDIO COMMUNICATION SESSIONS

FIELD OF THE INVENTION

The present invention relates generally to language translation services, and more particularly, to language translation for communication sessions.

BACKGROUND OF THE INVENTION

In an increasingly connected world, people are connecting with other people from various backgrounds and languages. Sometimes people connect via text and electronic mail messages which do not require real-time communication. However, people often communicate via real-time communication sessions such as during voice calls or during video conferencing sessions.

Because of an increasing diversity of persons communicating via live communication sessions, it is increasingly likely that some persons whose native language is different from the chosen language of the session will find it quite difficult to understand and/or be able to communicate effectively in the chosen language.

An approach to this language barrier issue for real-time communications is the use of machine language translators. However, machine language translators can often be too literal and do not perform well when interpreting some of the complexities and intricacies encountered during a natural conversation. At times, the robotic results of a machine translation can be laughable at best. However, an inability to clearly understand what is being communicated and/or to communicate effectively may have profound consequences such as loss of a business opportunity or may lead to even more dire outcomes. As a result, the language barrier still presents a serious challenge to the seamless flow of real-time communications.

Ideally, it would be extremely useful to be able to have language translation for real-time communication sessions, where the translation is efficient and conveys a natural sounding or human-like impression to other participants of a communication session. In addition, the language translation service should be able to effectively address the complexities associated with the differing contexts of various types of communication sessions.

Accordingly, there is need for a versatile and flexible online solution that relies on the advances in information technology to provide language translation services for real-time communication sessions to enable accurate translation and effective communication with respect to a chosen set of languages regardless of the context or topic of the communication session.

SUMMARY OF THE INVENTION

The present invention is directed to a method, a system, and a computer program product for providing context relevant language translation services for real-time communication sessions. A session-based language translation (SLT) utility/module receives from a user/individual a service request for translation between a first language and a second language by a human translation specialist during a scheduled live communication session. The SLT utility receives from the user contextual information, which describes the communication as one or more of social/conversational, business, and professional communication.

In addition, the SLT utility enables the user to select desired attributes of the language specialist including required skills and knowledge of the specialist. Based on the received information, the SLT utility provides a set of available candidates matching the requested context and attributes to enable the user to make a final selection. The SLT utility provides the selected translation specialist with credentials to access the communication session in order to perform the requested translation services once the user provides a context-dependent service payment.

According to one or more aspects, the real-time communication session is one of an audio conference call or a video conference call involving a number of participants.

According to another aspect, the real-time communication session is a phone call involving two or more participants.

According to an aspect, the SLT utility receives scheduling information which includes a date and time of the session and a duration of the requested translation services.

According to an aspect, the SLT utility determines a cost of the translation services based on a duration and complexity of the translation tasks, as well as on a predetermined measure of language difficulty.

According to an aspect, the SLT utility determines the translation task complexity based on the complexity of the subject matter and the level of translation skill required. According to one or more related aspects, the SLT utility can evaluate task complexity based on whether the human translation specialist is required to perform two-way/bi-directional translations which include translating from a first language to a second language and from the second language to the first language or one-way translation which includes only translating from a first language to a second language.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward providing context relevant language translation services for real-time communication sessions.

Figure 1:
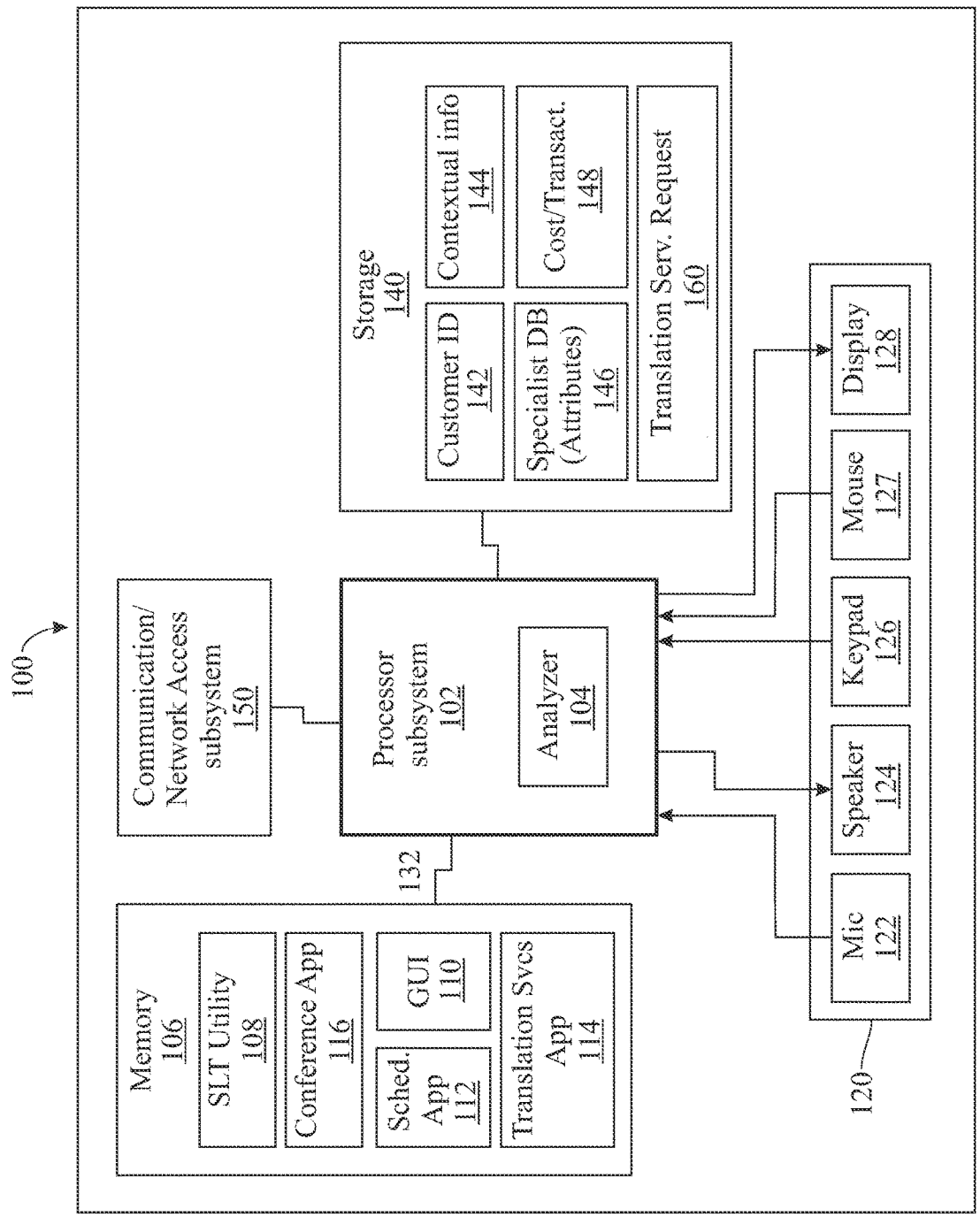
FIG. 1 illustrates a block diagram representation of an example data processing system within which certain features of the present disclosure can be implemented, according to one or more embodiments.

With reference now to the figures, and beginning with FIG. 1, there is depicted a block diagram representation of an example data processing system (DPS), as utilized within one embodiment. DPS may be a server, a digital audio workstation, a personal computer, a portable device, such as a personal digital assistant (PDA), a smart phone, and/or other types of electronic devices that may generally be considered processing devices or computing systems/devices. As illustrated, DPS 100 comprises at least one processor subsystem 102 connected to system memory 106 via system interlink/bus 132. DPS 100 executes one or more computer programs/applications to process a user's request for translation services within a communication session and provide a human translation specialist based on contextual information, according to the present disclosure.

In one or more embodiments, data processing device 100, which is managed by processor subsystem 102, also includes communication subsystem 150, data storage subsystem 140, and input/output (I/O) subsystem 120. As shown, processor subsystem 102 includes an analyzer module 104 to support the data analysis functionality of DPS 100. Processor subsystem 102 executes program code to provide operating functionality of data processing device 100. The software and/or firmware modules have varying functionality when their corresponding program code is executed by processor subsystem 102 or secondary processing devices (not explicitly shown) within DPS 100.

As illustrated, I/O subsystem 120 includes user interface devices including output devices such as audio output device(s)/speaker 124, and display device 128. In one or more implementations, display device 128 includes touch screen functionality enabling display device to function as both an input device and an output device. In addition, I/O subsystem 120 includes input devices including microphone 122, keypad 126 and mouse 127.

Processor subsystem 102 is communicatively coupled, via system bus/interlink 132, to device memory 106. In one or more embodiments, processor subsystem 102 is communicatively coupled via system interlink 132 to communication subsystem 150, data storage subsystem 140, and input/output subsystem 120. System interlink 132 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components.

Communication subsystem 150 may be configured to enable DPS 100 to communicate with a plurality of personal computing devices. The communication subsystem may include wired and/or wireless communication devices to facilitate networked communication. Communication subsystem 150 also includes a Network Access Module by which DPS 100 may connect to one or more access/external networks such as the Internet or wide area network (WAN), or an internal network such as an Ethernet (local area network-LAN) or a Virtual Private Network (VPN).

In addition to the above described hardware components of DPS 100, various features of the invention are completed/supported via software (or firmware) code or logic stored within memory 106 or other storage and executed by Processor subsystem 102. Thus, for example, illustrated within memory 106 are a number of software/firmware/logic components, including a Translation Services (Request) Application 114 and other applications. According to an aspect, the Translation Services Request Application is an online/Internet-based mobile application. In addition, memory 106 comprises a session-based language translation (SLT) module/logic/utility 108. Device memory 106 further includes an operating system (OS) (not shown), a firmware interface, such as basic input/output system (BIOS) or Uniform Extensible Firmware Interface (UEFI), and firmware (not shown). Device memory 106 includes a graphical user interface (GUI) 110, a scheduling application 112, a call/video conferencing application 116, and/or other computer data (not explicitly shown) used by the SLT utility 108 and/or the call/video conferencing application 116.

Data storage subsystem 140 enables further storage and retrieval of data, instructions, and code. In particular, data storage subsystem 140 provides applications, program code, and stored data on nonvolatile storage that is accessible by processor subsystem 102. For example, data storage subsystem 140 can provide, for use by the SLT utility 108, the customer identification (ID) 142, contextual data 144, Human Translation Specialist & Attributes database (DB) 146, Service costs and transaction records 148, and translation service request records 160. In addition, data storage subsystem 140 can provide a selection of program code and applications such as call/video conferencing application 116, and other related application(s) that can be used to schedule a communication session, such as a video conference, and facilitate information exchange via the communication session. These applications can be loaded into device memory 106 for execution by processor subsystem 102.

In actual implementation, the SLT logic 108 may be combined with the video conferencing application 116 to provide a single executable component, collectively providing the various functions of each individual component when the corresponding combined component is activated. For simplicity, the SLT logic/utility 108 is illustrated and described as a stand-alone or separate logic/firmware component, which provides specific functions, as described below.

In one embodiment, DPS 100 communicates with a software deploying server (not shown) via a network (e.g., the Internet) using communication subsystem/network access module 150. Then, SLT utility 108 may be deployed from/on the network, via the software deploying server. With this configuration, the software deploying server performs all of the functions associated with the execution of SLT utility 108. Accordingly, DPS 100 is not required to utilize internal computing resources of DPS 100 to execute SLT utility 108.

The SLT utility 108 provides translation services by a human specialist to a communication session to enable participants to communicate more effectively using respective preferred languages. The individual/customer can be presented with audio, visual and/or textual content associated during the various stages of the communication session via an output device of the I/O subsystem. According to an aspect of the present disclosure, the SLT utility/module 108 enables the individual to provide responses/feedback to the presented content via the GUI 110. According to one or more aspects, the individual/participant/customer can be presented with aural content via the speakers 124. The participant may also be visually presented via the display device 128 with image, video and/or textual content. In addition, the participant may be visually presented with one or more associated selection buttons within the GUI 110. Using an input device, such as the mouse 127, the keypad 126 or the microphone 127, the participant can provide an input selection as a response to presented content.

Certain of the functions supported and/or provided cby the SLT utility/module 108 are implemented as processing logic (or code) executed by processor subsystem 102 and/or other device hardware, which processing logic enables the device to implement/perform those function(s). Among the software code/instructions/logic provided by the SLT module 108, and which are specific to the disclosure, are: (a) logic for enabling a user to request a service for translation between first and second languages by a human specialist within a scheduled live communication session; (b) logic for receiving contextual information, which describes the communication session; (c) logic for receiving user desired attributes of the human language specialist including required skills and knowledge of the specialist; (d) logic for providing a set of available candidates matching the requested context and attributes to enable the user to make a final selection for a preferred specialist; (e) logic for receiving the user's selection of a human language specialist from among the candidate specialists; (f) logic for calculating translation services cost based on context, service duration, task complexity and language difficulty; (g) logic for receiving call scheduling information which includes a date and time of the communication session and a duration of the requested translation services; (h) logic for providing a notification, which includes access and scheduling information for the communication session, to the specialist; and (i) logic for providing the user with the human specialist's identification (ID) that will be used during the communication session. According to the illustrative embodiment, when Processor subsystem 102 executes the SLT logic/module 108, DPS 100 initiates a series of functional processes that enable the above functional features as well as additional features/functionality. These features/functionalities are described in greater detail below within the description of FIGS. 2-7.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Figure 2:
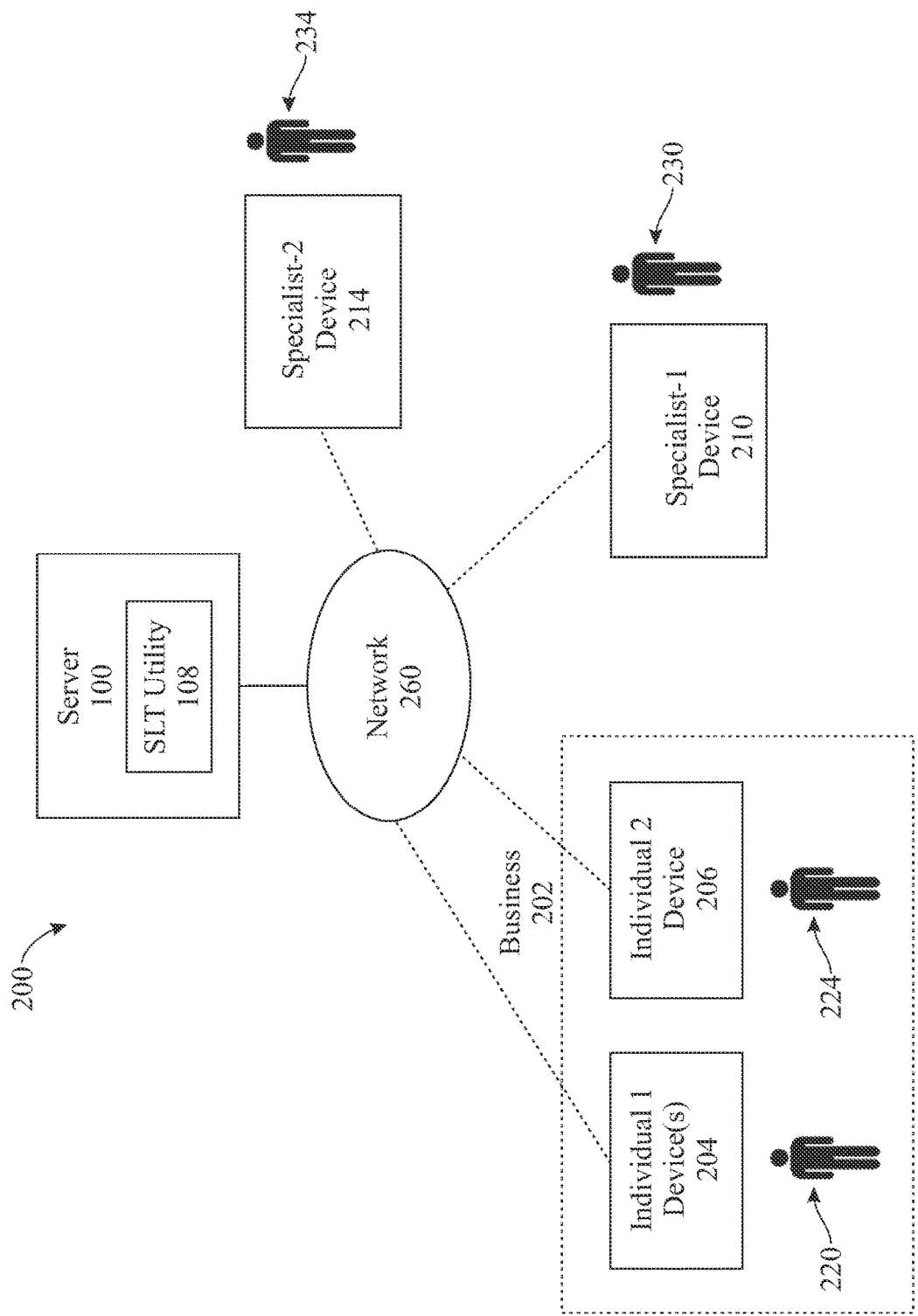
FIG. 2 illustrates a computer network for enabling individuals to access a translation service platform to request and receive language translation services for conference calls using human language specialists, according to one or more embodiments of the disclosure.

Referring now to FIG. 2, a computer network 200 for enabling individuals to access a translation service platform to request and receive language translation services for communication sessions, including conference calls, using human language specialists at various locations, according to one or more embodiments of the disclosure. As illustrated in the computer network 200, a number of computing/electronic devices are included. These computing devices, which can be similarly configured to DPS 100 (FIG. 1), include a server 100, individual-1 device(s) (i.e., a first individual's device(s)) 204, individual-2 device 206, specialist-1 device 210 and specialist-2 device 214. The various computing devices are connected by a network 260. The network 260 can be any of the various networks, including a LAN or a WAN/Internet, described in FIG. 1.

The computer network 200 allows customer/user IDs, human specialist ID information, and service costs to be sent by the server to the various individuals at the respective devices. In addition, response from the various individuals can be received by the server 100. Based on the communicated/received information, the SLT utility/module 108 can download configuration and control information to the various individual devices, respectively.

According to one or more aspects, and as illustrated in FIG. 2, individual-1 220 and individual-2 224 with their respective devices are shown within a business environment 202. The individuals (i.e., individual-1 220 and individual-2 224) represent users, such as co-workers at an enterprise/business. According to an aspect, a specialist-1 230 and a specialist-2 234 having respective devices 210 and 214 are located in separate remote locations. According to one or more aspects, the individual devices 204 include a personal/laptop/tablet computer and a smart-phone.

According to one or more aspects, the SLT module 108 receives a user's request for translation services within a communication session and provides a human translation specialist based on contextual information received from the user. In particular, the SLT utility 108 enables the user to request a service for translation between first and second languages by a human specialist within a scheduled live communication session. According to an aspect, the SLT utility 108 receives call scheduling information, which includes a date and time of the communication session and a duration of the requested translation services, from the user. In addition, the SLT utility 108 receives contextual information, which describes the communication session, from the user. The SLT utility enables the user to specify the desired attributes of the human language specialist including required skills and knowledge of the specialist. In response to receiving the language information and the attribute data, the SLT utility 108 performs a search of the registered human specialists listed in the specialists' database 146 and provides a set of available candidates matching requested language, context, and attributes to enable the user to make a final selection for a preferred specialist. The SLT utility 108 receives the user's selection of a human language specialist from among the candidate specialists.

According to an aspect, the SLT utility 108 receives, from the user, contextual information, which describes the communication session as one or more of social/conversational, business, and professional communication. According to one or more related aspects, the SLT utility 108 calculates the costs for translation services based on context, service duration, translation task complexity and language difficulty.

According to an aspect, the SLT utility 108 determines the translation task complexity based on the complexity of the subject matter and the level of translation skill required. According to one or more related aspects, the SLT utility 108 can evaluate task complexity based on whether the human translation specialist is required to perform two-way/bi-directional translations which include translating from a first language to a second language and from the second language to the first language or one-way translation which includes only translating from a first language to a second language.

In response to receipt of payment for translation services, the SLT utility 108 provides a notification, which includes access and scheduling information for the communication session, to the selected specialist. Additionally, the SLT utility 108 provides the user with the human specialist's identification (ID) that will be used during the communication session.

The SLT utility 108 provides translation services for various types of communication sessions. For example, the SLT utility 108 provides translation services for voice/audio conference calls, video conference calls, Voice over Internet Protocol (VOIP) calls, other live calls or sessions, and in-person conversations, within which a remote human translator actively monitoring the conversation can engage.

According to one or more aspects, the SLT utility 108 provides the selected translation specialist with sign-in credentials for live communication sessions. In response to the audio/video conference being initiated, the translation specialist is able to join the conference using the sign-in credentials. At the start of the session, the user who invited the translator can take the opportunity to introduce the translation specialist as a translator that will help ensure information is effectively communicated to and from the user.

According to an aspect, the SLT utility 108 is integrated with the conference application. According to one or more related aspects, the SLT utility 108 enables the translation specialist to create a private chatroom. The private chatroom enables the user and the translation specialist to communicate without causing a distraction to the other conference participants. As the presenter speaks within a main conference/chat room during the conference call, the user and the specialist simultaneously receive the presenter's speech content in a first language. According to an aspect, as soon as the translation specialist receives/hears speech content from the presenter, the translation specialist begins translating the presenter's content into a second language which is the preferred language of the user. The user begins receiving via the private chatroom the translated content in the second/preferred language while the content is being translated.

According to one or more aspects, the SLT utility 108 selectively configures the conference application 116 to enable the translation specialist/user to be able to monitor or listen to speech content presented via a first audio channel corresponding to the main chat room while being able to speak via the microphone only into the private chatroom to the user/translation specialist. According to another aspect, the SLT utility 108 selectively configures the conference application 116 to enable the translation specialist to be able to monitor or listen to the user's speech content received via a second audio channel corresponding to the private chat room while being able to speak via the microphone into the main chat room to the conference participants.

According to one or more aspects, the SLT utility 108 enables the translation specialist to provide translation services to multiple users having the same language translation requirements. Thus, the SLT utility 108 enables the users to request the service of a translation specialist and split the costs of hiring/contracting the specialist to provide a shared service in a same communication session or video conference. In this instance, multiple users can join the private chatroom to receive translated speech content from the certified/qualified and verified translation specialist. According to an aspect, the SLT utility 108 provides qualified translation specialists based on (universally) recognized certifications and/or degrees.

According to an aspect, if the user contracted/retained the translation specialist to provide bi-directional translation, the translation specialist is also prepared to translate speech content received in the second language from the user and to present the translated content to the conference participants in the first language.

According to an aspect, when the user is ready to present, the user can privately provide speech content in the user's spoken language to the translation specialist for translation and broadcast of the translated content in a first language to conference participants via a main conference/chat room. As the specialist translates the user's speech content into the first language, the other conference participants receive the translated content from the translation specialist, on behalf of user, in the first language.

Figure 3:
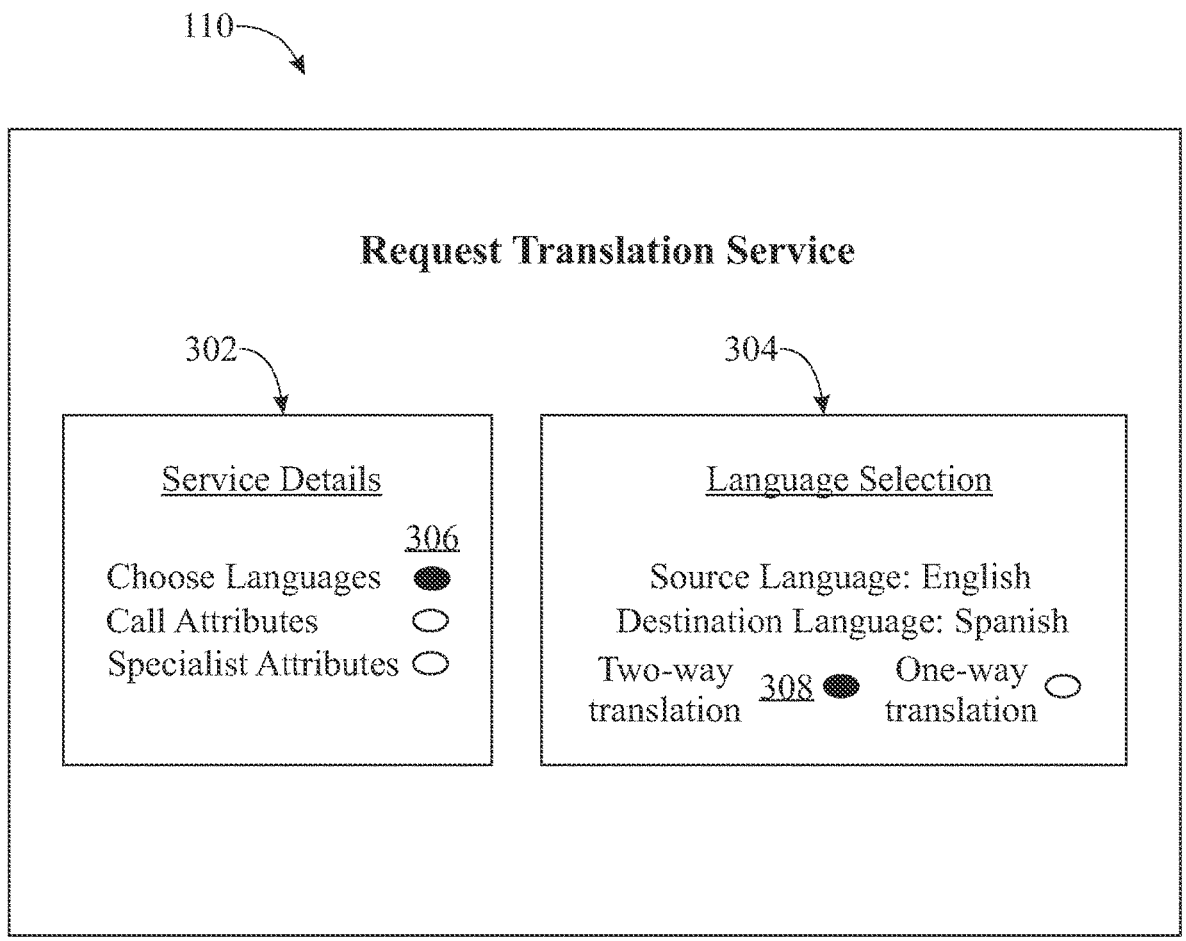
FIG. 3 presents a screenshot of a graphical user interface (GUI) by which a user can request translation services by a human specialist for a conference call, according to one or more embodiments.

FIG. 3 presents a screenshot of a graphical user interface (GUI) by which a user can request translation services by a human specialist for a conference call. As illustrated, GUI 110 includes a number of windows including service details menu window 302 and a language selection display window 304. GUI 110 is an example interface that is provided by the Translation Services (Request) Application 114. When a user activates the Translation Services (Request) Application, the SLT utility 108 presents GUI 110 on display 128 of DPS 100. Language selection window 304 shows information relevant and responsive to a user's selection in menu window 302.

Translation service details menu window 302 presents a number of topical steps/aspects associated with making a request including: (i) Choose Languages; (ii) Call Attributes; and (iii) Specialist Attributes. When the user selects the "Choose Languages" option, the SLT utility 108 presents in language selection window 304 a selection interface in which the user is able to select the first/source language and the second/destination language. As illustrated in language selection window 304, the source language is English, and the destination language is Spanish. The SLT utility 108 illustrates an active/current user selection by blacking out an interactive selection oval positioned adjacent to and to the right of the selected option. The GUI 110 also shows that the user is requesting two-way/bidirectional language translation services as opposed to a one-way translation service. The blacked out interactive selection ovals 306 and 308 indicate that the "Choose Languages" option and the "two-way translation" option are selected, respectively.

The selectable/presented options/items provided by GUI 110 have been described based on the specific options/items illustrated in the FIG. 3. However, this particular presentation of menu, function and options/items is provided for illustrative purposes, and the disclosure is by no means limited to the specific options/items and/or number of options/items presented.

FIGS. 4-7 are flow charts illustrating various methods by which the above process of the illustrative embodiments is completed. Although the methods illustrated in FIGS. 4-7 may be described with reference to components shown in FIGS. 1-3, it should be understood that this is merely for convenience and alternative components and/or configurations thereof can be employed when implementing the various methods. Key portions of the methods may be completed by the session-based language translation (SLT) module 108 executing on processor subsystem 102 within DPS 100 (FIG. 1) and controlling specific operations of/on DPS 100, and the methods are thus described from the perspective of either/both the SLT module 108 and DPS 100 or other device that provides the functionality associated with one or more versions of the SLT module 108.

Figure 4:
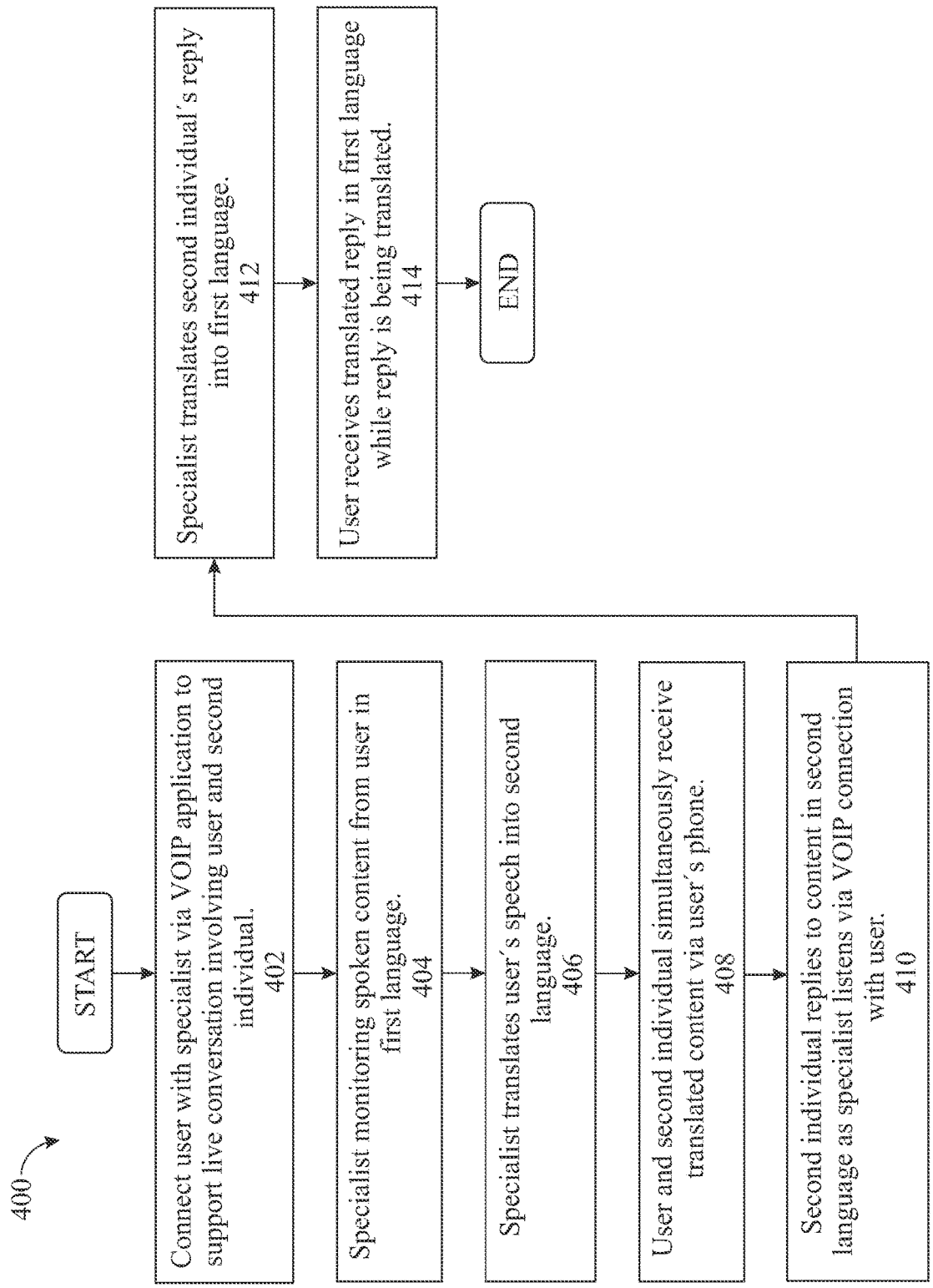
FIG. 4 presents a flow chart illustrating the process of providing human specialist translation services via Voice Over Internet Protocol (VOIP) to a user having an in-person conversation with another individual, according to one or more embodiments.

FIG. 4 presents a flow chart illustrating the process of providing human specialist translation services via Voice Over Internet Protocol (VOIP) to a user having an in-person conversation with another individual, according to one or more embodiments. The process of FIG. 4 begins at the initiator/start block and proceeds to block 402, at which the SLT module 108 connects the user with the translation specialist via a VOIP call application to support a live conversation involving the user and a second individual. In an example scenario, the user is a visitor to a foreign country and is attempting to "speak" with a local, who speaks the native/foreign language, to obtain dining and entertainment information and directions. The SLT module 108 detects when the translation specialist, while actively monitoring the user's conversation, hears the user's spoken content in a first language, as shown at block 404. According to an aspect, the phone is placed/operated in speaker mode while the specialist monitors and engages in the conversation.

At block 406, the SLT module 108 enables the specialist to translate the user's spoken content into the second language. The user and the second individual simultaneously receives translated content via the user's phone, as shown at block 408. At block 410, the SLT module 108 receives indication that the second individual replies to the translated content in the second language as the user "hears" (i.e., without fully comprehending) the reply (in-person) and the translation specialist listens to the reply via the VOIP connection with the user. At block 412, the specialist translates the content from the second individual into the first language. The user receives the translated content in the first language while the translation specialist translates the second individual's reply. The process proceeds to the end block.

Figure 5:
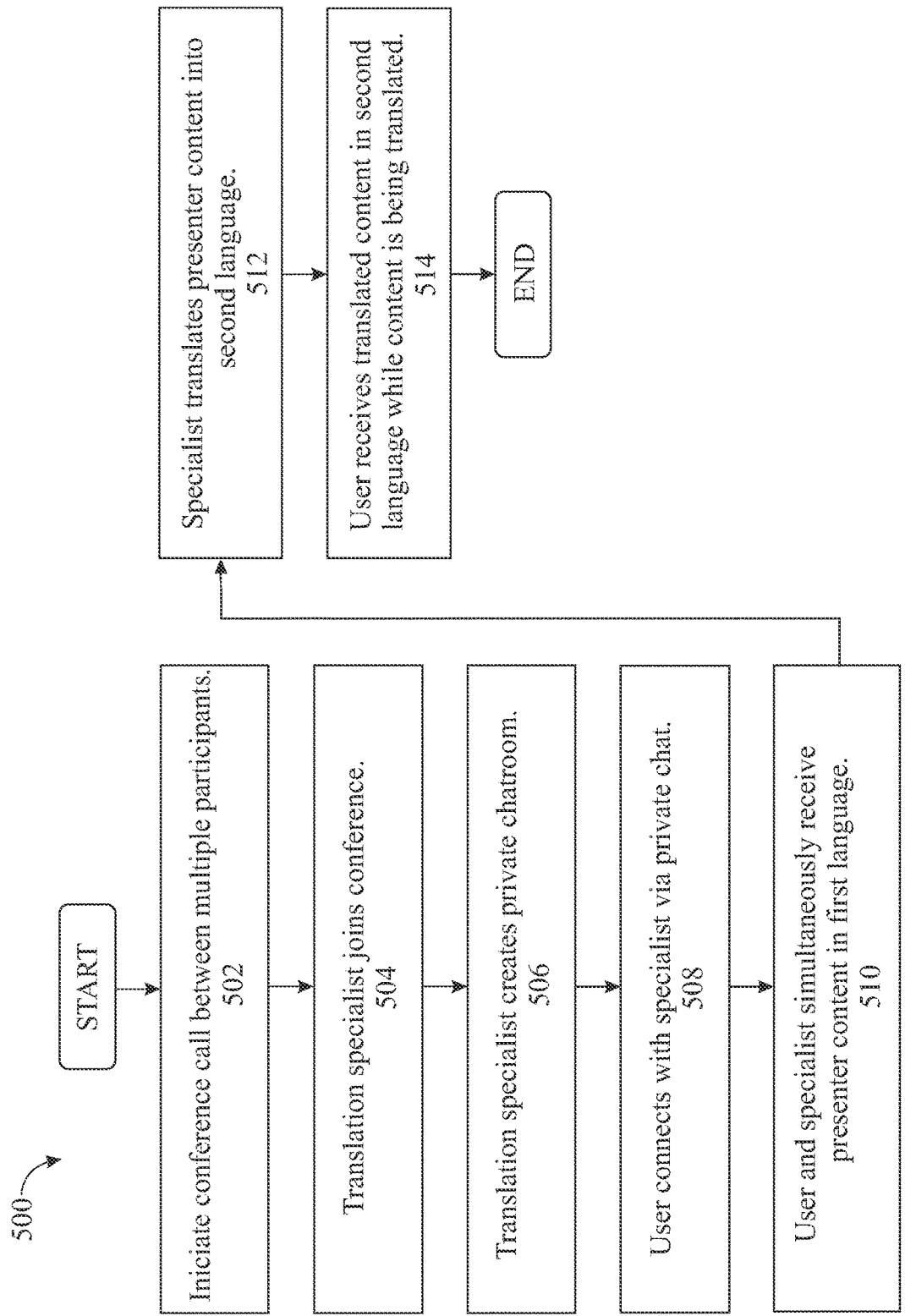
FIG. 5 presents a flow chart illustrating the process of providing human translation services to a user participating in a conference call, according to one or more embodiments.

FIG. 5 presents a flow chart illustrating the process of providing human translation services to a user participating in a conference call, according to one or more embodiments. The process of FIG. 5 begins at the initiator/start block and proceeds to block 502, at which the SLT module 108 initiates a communication session between multiple participants. According to an aspect, the communication session is a video conference.

According to one or more aspects, the SLT utility 108 provides the selected translation specialist with sign-in credentials for live communication sessions. In response to the audio/video conference being initiated, the translation specialist is able to join the conference using the sign-in credentials. At the start of the conference, the user who invited the translator can take the opportunity to introduce the translation specialist as a translator that will help ensure information is effectively communicated to and from the user. At block 504, the SLT module 108 detects when the translation specialist joins the conference call.

According to an aspect, the SLT utility 108 is integrated with the conference application. According to one or more related aspects, the SLT utility 108 detects when the translation specialist creates a private chatroom, as shown at block 506. The user connects with the translation specialist via the private chatroom, as shown at block 508. According to an aspect, the private chatroom enables the user and the translation specialist to communicate without causing a distraction to the other conference participants. As the presenter speaks during the conference call, the user and the specialist simultaneously receive the presenter's speech content in a first language, as shown at block 510. According to an aspect, as soon as the translation specialist receives/hears speech content from the presenter, the translation specialist begins translating the presenter's content into a second language which is the preferred language of the user, as shown at block 512. At block 514, the user begins receiving via the private chatroom the translated content in the second/preferred language while the content is being translated. The process proceeds to the end block.

According to an aspect, the SLT utility 108 configures the conference application to enable a user to monitor (i.e., listen to) a main chatroom and a private chatroom simultaneously. According to an aspect, the user can control the relative volume levels of speech content coming from these chatrooms based on which content the user wishes to direct a greater focus.

Figure 6:
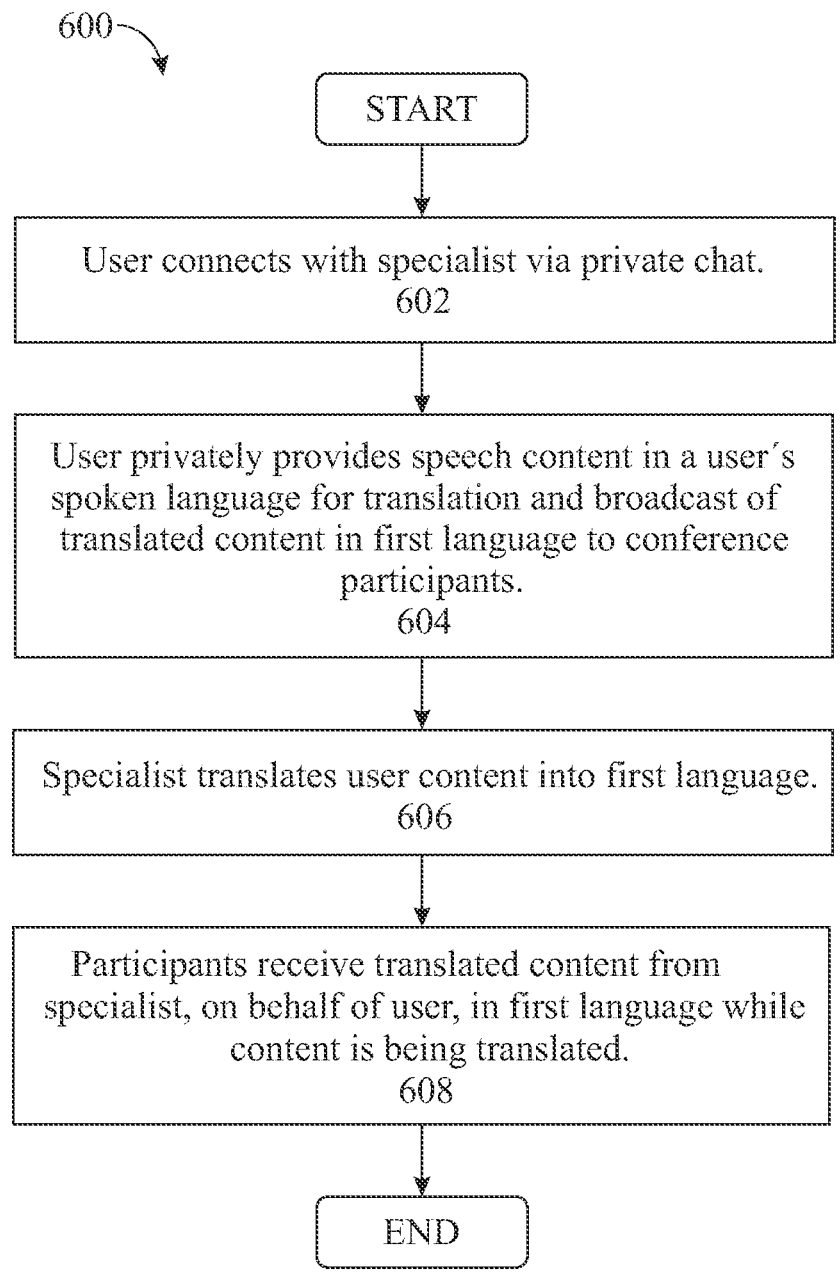
FIG. 6 presents a flow chart illustrating the process of using a human specialist to translate a user's speech content and to present the translated speech to other participants in the conference call, according to one or more embodiments.

According to an aspect, if the user contracted/retained the translation specialist to provide bi-directional translation, the translation specialist is also prepared to translate speech content received in the second language from the user and to present the translated content to the conference participants in the first language, as is described in FIG. 6.

FIG. 6 presents a flow chart illustrating the process of using a human specialist to translate a user's speech content and to present the translated speech to other participants in the conference call, according to one or more embodiments. The process of FIG. 6 begins at the initiator/start block and proceeds to block 602, at which the SLT module 108 detects when the user connects with the translation specialist via the private chatroom.

According to an aspect, when the user is ready to present/speak to the conference participants, the user can privately provide speech content in the user's spoken language to the translation specialist for translation and broadcast of the translated content in a first language to conference participants, as shown at block 604. As the specialist translates the user's speech content into the first language (block 606), the other conference participants receive the translated content from the translation specialist, on behalf of user, in the first language (block 608). The process then proceeds to the end block.

Figure 7:
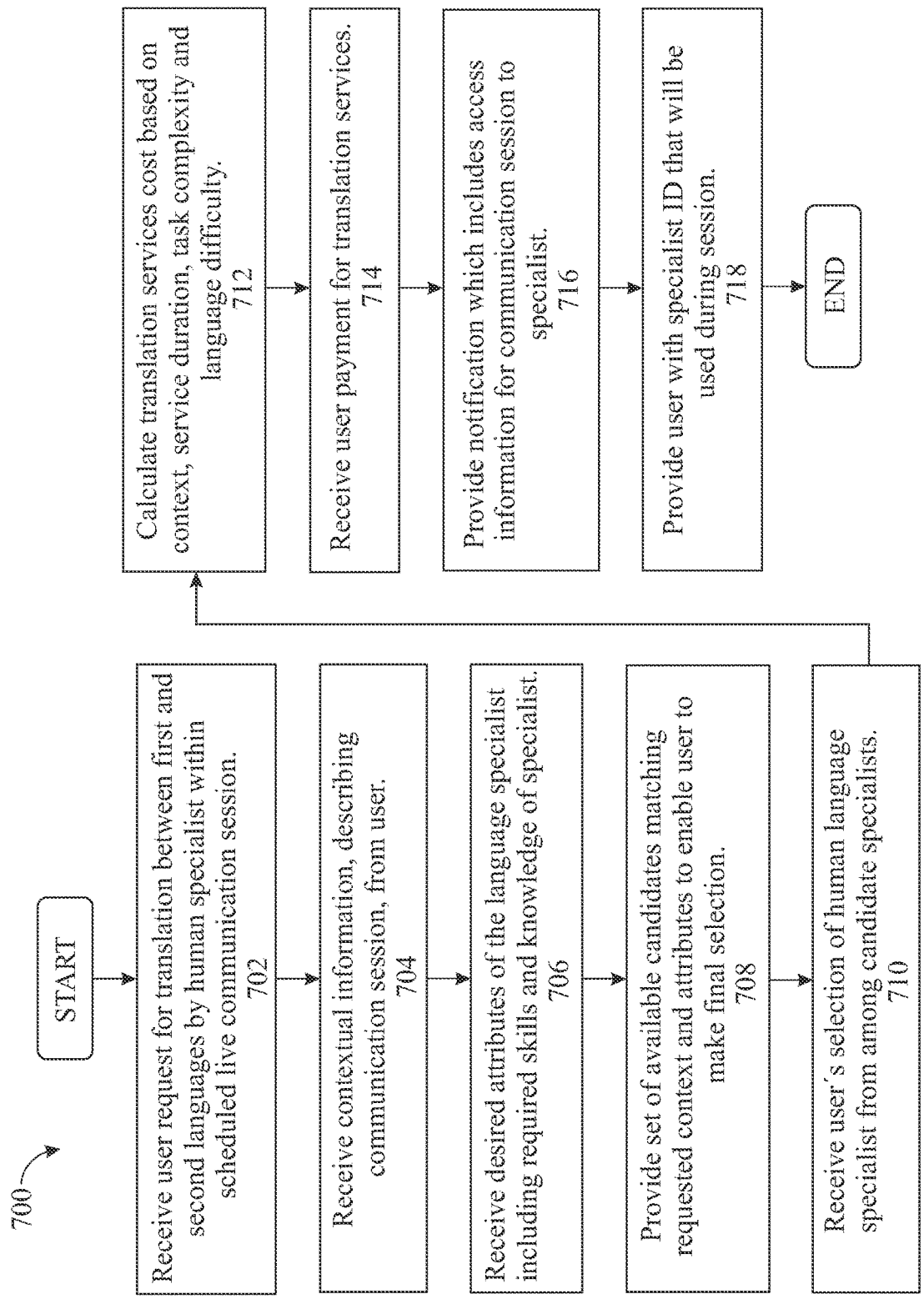
FIG. 7 presents a flow chart illustrating the process of receiving a user's request for translation services within a communication session and providing a human translation specialist based on contextual information, according to one or more embodiments.

FIG. 7 presents a flow chart illustrating the process of receiving a user's request for translation services within a communication session and providing a human translation specialist based on contextual information, according to one or more embodiments. The process of FIG. 7 begins at the initiator/start block and proceeds to block 702, at which the SLT module 108 receives a user request for translation services by which speech translations are provided between first and second languages by a human specialist within a scheduled live communication session.

At block 704, the SLT module 108 receives contextual information, which describes the communication session, from the user. The SLT utility enables the user to specify the desired attributes of the human language specialist including required skills and knowledge of the specialist, as shown at block 706. In response to receiving the language information and the attribute data, the SLT utility 108 performs a search of the registered human specialists listed in the specialists' database 146 and provides a set of available candidates matching requested language, context, and attributes to enable the user to make a final selection for a preferred specialist, as shown at block 708. At block 710, the SLT utility 108 receives the user's selection of a human language specialist from among the candidate specialists.

According to an aspect, the SLT utility 108 receives, from the user, contextual information, which describes the communication session as one or more of social/conversational, business, and professional communication. According to one or more related aspects, the SLT utility 108 calculates the costs for translation services based on context, service duration, translation task complexity and language difficulty, as shown at block 712.

According to an aspect, the SLT utility 108 determines the translation task complexity based on the complexity of the subject matter and the level of translation skill required. According to one or more related aspects, the SLT utility 108 can evaluate task complexity based on whether the human translation specialist is required to perform two-way/bi-directional translations which include translating from a first language to a second language and from the second language to the first language or one-way translation which includes only translating from a first language to a second language.

In response to receipt of payment for translation services (block 714), the SLT utility 108 provides a notification which includes access and scheduling information for the communication session to the selected specialist, as shown at block 716. Additionally, the SLT utility 108 provides the user with the human specialist's identification (ID) that will be used during the communication session, as shown at block 718. The process proceeds to the end block.

According to an aspect, the SLT utility 108 provides translation services for various types of communication sessions. For example, the SLT utility 108 provides translation services for voice/audio conference calls, video conference calls, Voice over Internet Protocol (VOIP) calls, other live calls and sessions, and in-person conversations, within which a remote human translator actively monitoring the conversation can engage.

As described herein, a method, a system, and a computer program product provide context relevant language translation services for real-time communication sessions. A session-based language translation (SLT) utility/module receives from a user/individual a service request for translation between a first language and a second language by a human translation specialist during a scheduled live communication session. The SLT utility receives from the user contextual information, which describes the communication as one or more of social/conversational, business, and professional communication. In addition, the SLT utility enables the user to select expected attributes of the language specialist including required skills and knowledge of the specialist. Based on the received information, the SLT utility provides a set of available candidates matching the requested context and attributes to enable the user to make a final selection. The SLT utility provides the selected translation specialist with credentials to access the communication session in order to perform the requested translation services once the user provides a context-dependent service payment.

According to one or more aspects, the real-time communication session is one of an audio conference call or a video conference call involving a number of participants.

According to another aspect, the real-time communication session is a phone call involving two or more participants.

According to an aspect, the SLT utility receives scheduling information which includes a date and time of the session and a duration of the requested translation services.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computerized method for providing context relevant language translation services for real-time communication sessions, the method comprising:
   receiving from a user a service request for translation between a first language and a second language by a human translation specialist;
   receiving from the user contextual information describing the communication session;
   receiving from the user information specifying desired attributes of the translation specialist;
   selecting a preferred translation specialist based on the requested context and the desired attributes;
   receiving a context-dependent service payment from the user;
   notifying the preferred translation specialist of the selection;
   providing the preferred translation specialist with credentials to access the communication session in order to perform the requested translation services;
   enabling participants to access the communication session to perform live communication via an application;
   determining whether the user and the preferred translation specialist have accessed the communication session; and
   in response to determining that the user and the preferred translation specialist have accessed the communication session, providing between the user and the preferred translation specialist one or more communication channels including a private communication channel.

2. The method of claim 1, further comprising:
   providing from the user to the preferred translation specialist, via the private communication channel, speech content provided using a second language for translation into a first language; and
   providing from the preferred language specialist via a shared communication session channel a translation of the speech content into the first language to session participants.

3. The method of claim 1, further comprising:
   providing live content from a presenting participant to both the user and to the preferred translation specialist in a first language; and providing via the private communication channel from the preferred translation specialist speech content which can include a translation of the presenting participant's live content into second language.

4. The method of claim 3, further comprising:
following receipt of the translation provided in the second language, the user provides a reply in the second language to the preferred translation specialist via the private channel, enabling the preferred translation specialist to translate the reply into the first language; and
providing via a shared communication session channel the translated reply to session participants.

5. The method of claim 1, wherein said selecting further comprises:
providing a list of available candidates matching requested context and attributes to enable the user to select a preferred translation specialist from among the available candidates; and
receiving the user's selection of a human translation specialist from among the available candidates.

6. The method of claim 1, wherein;
the communication session is a Voice Over Internet Protocol (VOIP) communication session.

7. A data processing system for providing context relevant language translation services for real-time communication sessions, the system comprising:
a memory storing software instructions;
one or more processors which executes the software instructions to provide the functionality of:
receiving from a user a service request for translation between a first language and a second language by a human translation specialist;
receiving from the user contextual information describing the communication session;
receiving from the user information specifying desired attributes of the translation specialist;
selecting a preferred translation specialist based on the requested context and the desired attributes;
receiving a context-dependent service payment from the user;
notifying the preferred translation specialist of the selection;
providing the preferred translation specialist with credentials to access the communication session in order to perform the requested translation services;
enabling participants to access the communication session to perform live communication via an application;
determining whether the user and the preferred translation specialist have accessed the communication session; and
in response to determining that the user and the preferred translation specialist have accessed the communication session, providing between the user and the preferred translation specialist one or more communication channels including a private communication channel.

8. The system of claim 7, further comprising:
providing from the user to the preferred translation specialist, via the private communication channel, speech content provided using a second language for translation into a first language; and
providing from the preferred language specialist via a shared communication session channel a translation of the speech content into the first language to session participants.

9. The system of claim 7, further comprising:
providing live content from a presenting participant to both the user and to the preferred translation specialist in a first language; and
providing via the private communication channel from the preferred translation specialist speech content which can include a translation of the presenting participant's live content into second language.

10. The system of claim 9, further comprising:
following receipt of the translation provided in the second language, the user provides a reply in the second language to the preferred translation specialist via the private channel, enabling the preferred translation specialist to translate the reply into the first language; and
providing via a shared communication session channel the translated reply to session participants.

11. The system of claim 7, wherein said selecting further comprises:
providing a list of available candidates matching requested context and attributes to enable the user to select a preferred translation specialist from among the available candidates; and
receiving the user's selection of a human translation specialist from among the available candidates.

12. The system of claim 7, wherein:
the communication session is a Voice Over Internet Protocol (VOIP) communication session.

13. A computer program product comprising:
a computer readable storage device; and
program code on the computer readable storage device that when executed by a processor associated with a data processing system, the program code enables the data processing system to provide functionality of:
receiving from a user a service request for translation between a first language and a second language by a human translation specialist;
receiving from the user contextual information describing the communication session;
receiving from the user information specifying desired attributes of the translation specialist;
selecting a preferred translation specialist based on the requested context and the desired attributes;
receiving a context-dependent service payment from the user;
notifying the preferred translation specialist of the selection;
providing the preferred translation specialist with credentials to access the communication session in order to perform the requested translation services;
enabling participants to access the communication session to perform live communication via an application;
determining whether the user and the preferred translation specialist have accessed the communication session; and
in response to determining that the user and the preferred translation specialist have accessed the communication session, providing between the user and the preferred translation specialist one or more communication channels including a private communication channel.

14. The computer program product of claim 13, wherein the program code enables the system to provide the functionality of:
providing from the user to the preferred translation specialist, via the private communication channel, speech content provided using a second language for translation into a first language; and providing from the preferred language specialist via a shared communication session channel a translation of the speech content into the first language to session participants.

15. The computer program product of claim 13, wherein the program code enables the system to provide the functionality of:
   providing live content from a presenting participant to both the user and to the preferred translation specialist in a first language; and
   providing via the private communication channel from the preferred translation specialist speech content which can include a translation of the presenting participant's live content into second language.

16. The computer program product of claim 15, wherein the program code enables the system to provide the functionality of:
   following receipt of the translation provided in the second language, the user provides a reply in the second language to the preferred translation specialist via the private channel, enabling the preferred translation specialist to translate the reply into the first language; and
   providing via a shared communication session channel the translated reply to session participants.

17. The computer program product of claim 13, wherein the program code enables the system to provide the functionality of selecting a preferred translation specialist by:
   providing a list of available candidates matching requested context and attributes to enable the user to select a preferred translation specialist from among the available candidates; and
   receiving the user's selection of a human translation specialist from among the available candidates.

\* \* \* \* \*